United States Patent
Stelle, IV et al.

(10) Patent No.: US 11,901,965 B2
(45) Date of Patent: Feb. 13, 2024

(54) METHOD AND SYSTEM FOR MAPPING POTENTIAL NET SERVICE IMPAIRMENTS

(71) Applicant: VIAVI SOLUTIONS INC., San Jose, CA (US)

(72) Inventors: Raleigh Benton Stelle, IV, Indianapolis, IN (US); Robert J. Flask, New Palestine, IN (US); Mark R. Darragh, Noblesville, IN (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 72 days.

(21) Appl. No.: 16/919,555

(22) Filed: Jul. 2, 2020

(65) Prior Publication Data
US 2022/0006542 A1 Jan. 6, 2022

(51) Int. Cl.
| | | |
|---|---|---|
| *H04B 17/354* | (2015.01) | |
| *H04B 17/318* | (2015.01) | |
| *H04W 16/18* | (2009.01) | |
| *H04W 4/029* | (2018.01) | |
| *H04W 24/08* | (2009.01) | |
| *H04W 84/04* | (2009.01) | |

(52) U.S. Cl.
CPC ........ *H04B 17/354* (2015.01); *H04B 17/318* (2015.01); *H04W 4/029* (2018.02); *H04W 16/18* (2013.01); *H04W 24/08* (2013.01); *H04W 84/042* (2013.01)

(58) Field of Classification Search
CPC ... H04B 17/354; H04B 17/318; H04W 4/029; H04W 16/18; H04W 24/08; H04W 84/042
USPC ...................................... 455/422.1
See application file for complete search history.

(56) References Cited

U.S. PATENT DOCUMENTS

| | | | | |
|---|---|---|---|---|
| 8,154,303 B2* | 4/2012 | Maxson | ................. | G01S 19/38 |
| | | | | 348/192 |
| 8,868,736 B2* | 10/2014 | Bowler | ............... | H04L 43/0823 |
| | | | | 709/224 |
| 9,838,896 B1* | 12/2017 | Barnickel | ............. | H04W 4/026 |
| 2006/0258295 A1* | 11/2006 | Wong | .................... | H04W 24/00 |
| | | | | 455/67.13 |
| 2012/0208522 A1* | 8/2012 | Marklund | ............. | H04W 24/08 |
| | | | | 455/422.1 |
| 2013/0316750 A1* | 11/2013 | Couch | ................. | H04L 41/0618 |
| | | | | 455/501 |
| 2017/0127292 A1* | 5/2017 | Jones | .................... | H04W 4/021 |

* cited by examiner

*Primary Examiner* — William Nealon
(74) *Attorney, Agent, or Firm* — DLA Piper LLP (US)

(57) ABSTRACT

A method, apparatus and system for determining and mapping potential net service impairments using multiple datasets associated with a network.

15 Claims, 5 Drawing Sheets

METHOD AND SYSTEM FOR MAPPING POTENTIAL NET SERVICE IMPAIRMENTS

BACKGROUND

Program providers such as television networks and stations, cable TV operators, satellite TV operators, studios, wireless service providers, and Internet broadcasters/service providers, among others, may require broadband communication systems to deliver programming and like content to consumers/subscribers over networks via digital and or analog signals. Such networks and physical plants can be extensive and complex and are typically difficult for an operator to manage and monitor for faults, impairments, maintenance and other issues. For instance, the monitoring of network maintenance activities may particularly present problems to operators of extensive cable networks.

By way of example, a cable network may include a headend which is connected to several nodes that may provide access to IP or ISPN networks. The headend typically interfaces with a cable modem termination system (CMTS) which has several receivers with each receiver connecting to numerous nodes each of which connect to numerous network elements, such as, for example, modems, MTA (media terminal adaptors), set top boxes, terminal devices, customer premises equipment (CPE) or like devices of subscribers. For instance, a single receiver of the CMTS may connect to several hundred or more network elements. Cable modems may support data connection to the Internet and other computer networks via the cable network, and the cable networks provides bi-directional communication systems in which data can be sent downstream from the headend to a subscriber and upstream from a subscriber to the headend. The cable networks typically include a variety of cables such as coaxial cables, optical fiber cables, or a Hybrid Fiber/Coaxial (HFC) cable system which interconnect the cable modems of subscribers to the headend in a tree and branch structure where terminal network elements (MTA, cable modem, set top box, etc.) reside on various optical nodes. The nodes may be combined and serviced by common components at the headend.

Currently, cable TV and similar providers have the ability to create a signal leakage dataset that may allow a technician or other personnel to focus on geographic areas with the most signal egress from the plant. It is not uncommon to have cable providers inadvertently interfere with the long-term evolution (LTE) providers' signal if the signal leakage reaches a high enough level. What is not clear to the technician is how large the signal egress would need to be before it would reach the level that the off air service provider will find concerning. There is no good method for the technicians to determine this at this time. This commonly results in cellular providers having to locate problems in the field and then contact the offending cable company to resolve the issue since the cable company is often unaware of the problem. As can be appreciated, this is undesirable.

DETAILED DESCRIPTION OF SEVERAL EMBODIMENTS

There exists a need for a management and/or monitoring system, tool and/or method that enables issues occurring in a network, such as a cable network, to be proactively and automatically located. A one way to address this need is to use more than one dataset to diagnose issues and their impact on a network. For example, information concerning the geographical location of one or more issues, the nature of the issues, and/or the severity of the issues, when taken collectively, may provide useful information to a network operator or technician if provided in a timely manner so that issues can be quickly detected, isolated, located and addressed. In addition, historical, long term, and periodic health information about a network may aid in determining trends that may indicate slow and steady degradation of a network element or component.

Such degradation may not otherwise be detected based on spot checks until an actual failure occurs. If at least some of these tasks are accomplished automatically and if such a system or tool can scale across extremely large networks, this may permit network operators to become more proactive with network maintenance activities and to achieve higher levels of network availability and reliability. This may also enable operational costs to be reduced by decreasing the need for real time troubleshooting for a problem or issue that does not pose a significant threat. Likewise, resources can be allocated to issues that pose significant threats. Still further, the periodic collection and analysis of network conditions may provide a view into critical network indicators and aid in resolving issues prior to customer impact.

According to an embodiment, network monitoring is performed such that information from several data sources concerning the geographic location of monitored network elements and associated network component topology may be automatically collected and populated into a network management database for purposes of providing a composite dataset and visual display, such as a geographically accurate street map or satellite image of a region of a service area, that can accurately indicate a fault or other issue and the signal levels seen radiating from them. Thus, the signal radiation is displayed on the map along with the location of the signal leakage egress. Such a map provides a useful network management tool to network operators and field technicians for resolving issues in a prioritized, efficient and prompt manner.

As one contemplated example, the map can be provided as part of a graphical interface, which displays signal radiation of varying severity levels ranging from net service impairment potentials to complete service disablement. Accordingly, in at least some embodiments, the severity of a fault on the network is automatically determined and displayed with the estimated signal radiation of the fault on the map. In one or more embodiments, the map may resemble a "heat-map" where areas of immediate concern are graphically and visually distinguished from other impairment potentials.

In addition, the network monitoring and management system or tool can be provided and fully integrated into software that is loaded to a technician's computer device and resides on a remote server connected to or communicating with the network. In addition to, or alternatively, the software may reside on other devices and equipment such as equipment located at the headend of the network, cloud devices, portable and or mobile devices. This approach eliminates the need for manual analysis of data and permits large amounts of diverse data (e.g., leakage data, LTE data, GPS/location data, etc.) to be automatically analyzed electronically by microprocessors or the like on a large scale.

The signal radiation of a fault and surrounding network path can be estimated, isolated, and displayed despite minimum information and manually entered data concerning the actual network path or network element location being available. The graphical interface can identify and display specific network elements as problematic. As an example, a network or HFC component such as cables, taps, passives, or the like that is identified as a suspect component potentially contributing to signal radiation may be identified and displayed as a location of a fault. Whether a fault impacts a single subscriber or a group of subscribers may also be estimated and shown in the display and may be based on a composite of different data (e.g., leakage data, LTE data, GPS/location data, etc.).

Various snap-shot views of an example graphical user interface are provided in FIGS. 1-4 and are discussed below. It should be understood that these are merely examples of how information may be displayed in accordance with the disclosed principles and that the displayed interfaces may be altered as desired.

Figure 1:
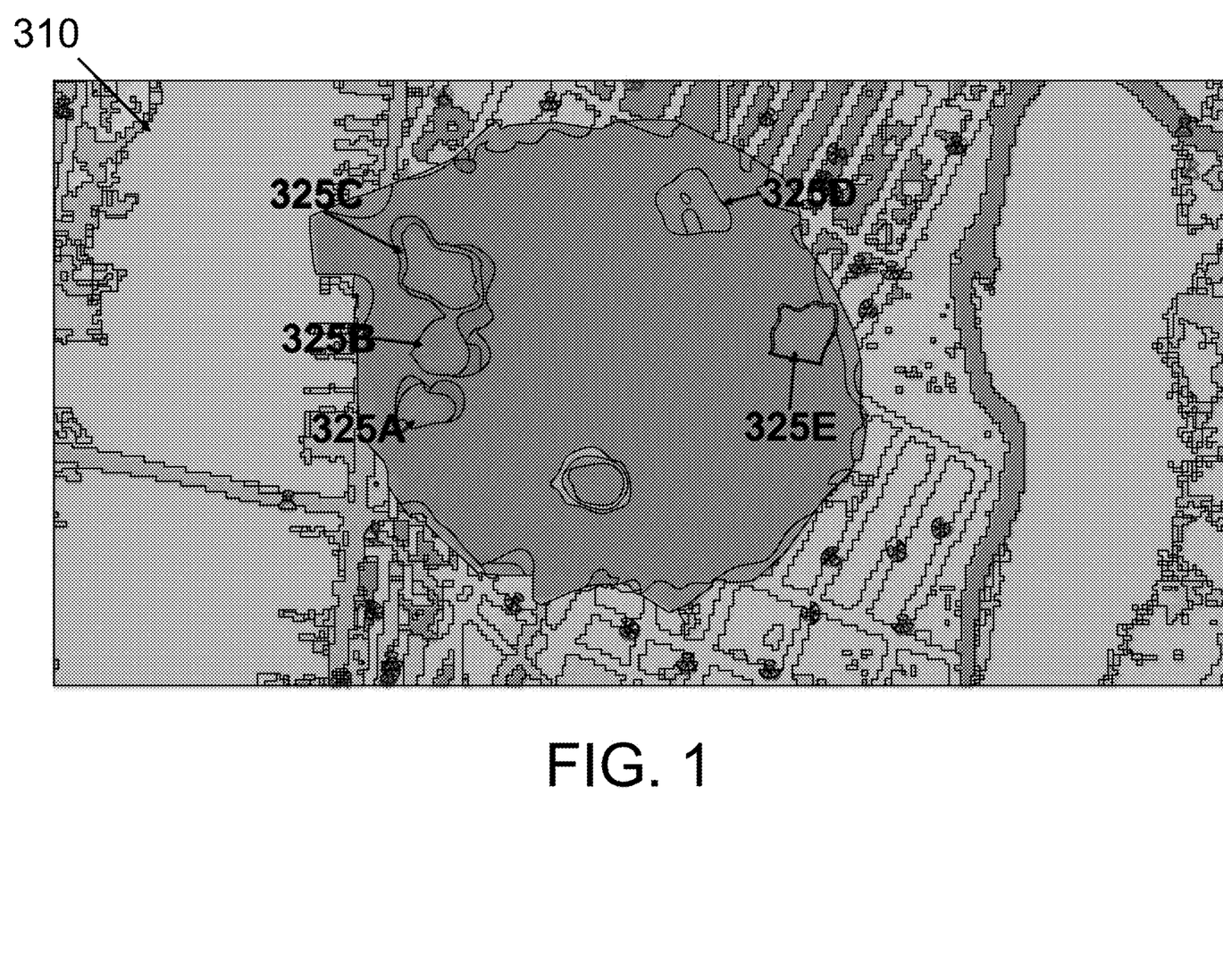
FIG. 1 shows an example signal leakage heat-map associated with geographical coordinates of at least one network element on a network, in accordance with the principles disclosed herein.

FIG. 1 shows an example signal leakage "heat-map" 310 associated with geographical coordinates of at least one network element on a network, in accordance with the principles disclosed herein. While the term "heat-map" is used herein to refer to the various maps, it should be appreciated that these maps are not limited to heat or temperature. Instead, each map illustrates a network issue (e.g., signal radiation leakage) by its appropriate dataset (e.g., signal level at a location). The values of the data may be represented in a way that resembles how heat/temperature is often graphically displayed. For example, a low signal level may be represented in a manner a user would typically associate as cold or a low temperature on a heat-map (e.g., with a first color such as blue). Likewise, a high signal level may be represented in a manner a user would typically associate as hot or a high temperature on a heat-map (e.g., with a different color such as red).

The network may be a hybrid fiber-coaxial (HFC) network which may interconnect the terminal network elements, such as cable modems, to a headend of the network having a cable modem termination system (CMTS) via a tree and branch network structure. The upstream communications are the communications transmitted in a direction from the terminal network elements toward the headend. Network components are excluded in the signal leakage heat-map 310. The heat-map 310 includes the network faults. The network faults can include regions 325A, 325B, 325C, 325D, 325E of signal leakage egress in relation to the nearest node or other network component (not shown). The shade (or color, etc.) of the signal leakage egress can be used to visually indicate a fault on the heat-map 310. For instance, high-strength signal leakage region 325E is shown in a dark shade (or a particularly color, such as red) which may indicate a fault of critical severity. Likewise, small strength signal leakage regions 325A, 325B, 325C are displayed in lighter shades (other colors, such as blue) to indicate low egress or a fault of a minor severity while medium strength region 325D of signal leakage egress is shown in a different shade (or a particularly color, such as yellow) to distinguish it from the other less severe and more severe regions and potential faults.

The signal level strength of a network fault may be determined by receiving information electronically of the physical topology of the network. This may include data pulls of information concerning network components and signal levels radiating from the network components and terminal network elements. The network fault may also be detected by automatically and electronically monitoring performance parameters transmitted via upstream communications from terminal network elements and automatically estimating a signal level strength of the network fault based on the performance parameter detected.

Today, considering only a single heat-map illustrating the signal leakage model, network operators and field technicians would naturally service the highest known leakage sources as they are usually more likely to cause problems in their network. In the illustrated example, without the principles disclosed herein, a technician may attempt to diagnose high-strength region 325E. However, this is completely blind to the potential interference that can be caused by signal leakage (e.g., small strength regions 325A, 325B, and 325C, and medium strength region 325D) from their network into other networks in the area, for example, LTE.

Figure 2:
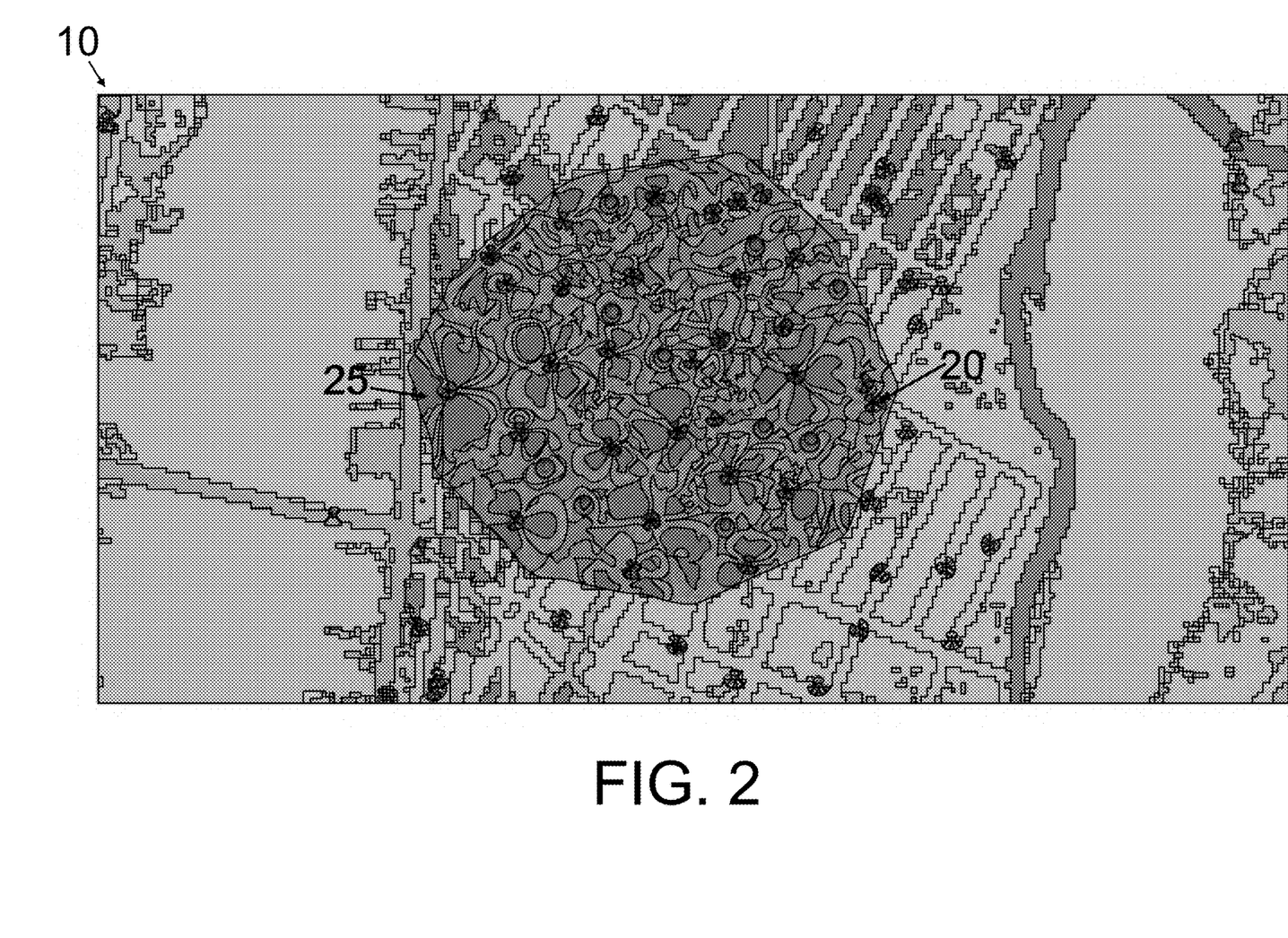
FIG. 2 shows an example long-term evolution (LTE) heat-map with first information concerning geographical coordinates of at least one network element on a network, in accordance with the principles disclosed herein.

FIG. 2 shows an example long-term evolution (LTE) "heat-map" 10 displaying first information concerning signal level strength of at least one network element 20 on a network, in accordance with the principles disclosed herein. By way of example, the network component 20 may include typical features of an LTE network such as, for example, a cell tower. The LTE heat-map 10 also includes the signal level strength of a plurality of high-strength regions 25 in relation to the nearest node or other network component 20 exhibiting signal leakage egress. In one or more embodiments, the heat-map 10 may utilize the same color scheme as heat-map 310 discussed above.

The heat-map 10 may include roads and streets and names thereof. In addition, the high-strength signal leakage regions 25 and the network component 20 can be overlaid on satellite images, of the geographical service area in which the network components are located. The LTE heat-map 10 may be displayed to a user via a monitor or other electronic display screen.

When an issue, fault or signal leakage is identified, it can be associated and displayed with other issues, faults and signal leakage based on signal strength levels. This group or cluster of signal leakages provides a visual indicator of the network elements affected and can indicate a center point of a potential problem causing the cluster of signal leakage. The cluster of signal leakages may have a single corresponding "signal leakage" object to thereby reduce the number of signal leakage objects displayed to the user.

Figure 3:
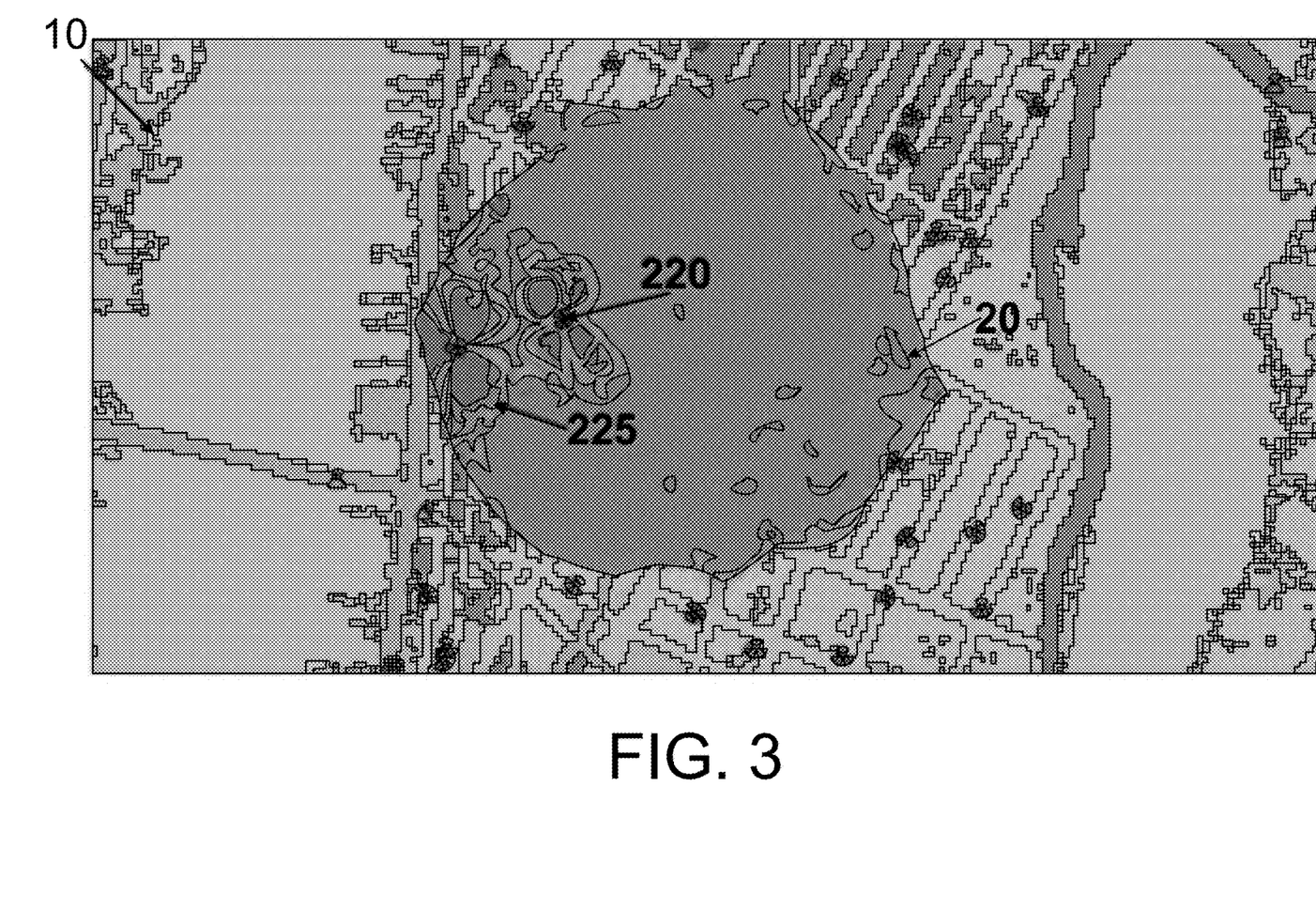
FIG. 3 shows an example filtered LTE heat-map with second information concerning geographical coordinates of at least one network element on a network, in accordance with the principles disclosed herein.

FIG. 3 shows an example filtered LTE heat-map 210 with second information concerning signal level strength of at least one network element 220 on a network, in accordance with the principles disclosed herein. The second information includes less data points than the first information concerning signal level strength of the at least one network element (of FIG. 2). The filtered LTE heat-map 210 includes network elements 220 and high strength signal leakage regions 225.

For example, two cell towers are provided in the filtered LTE heat-map 210. The filtered LTE heat-map 210 is provided by way of example to illustrate the configurable datasets.

Figure 4:
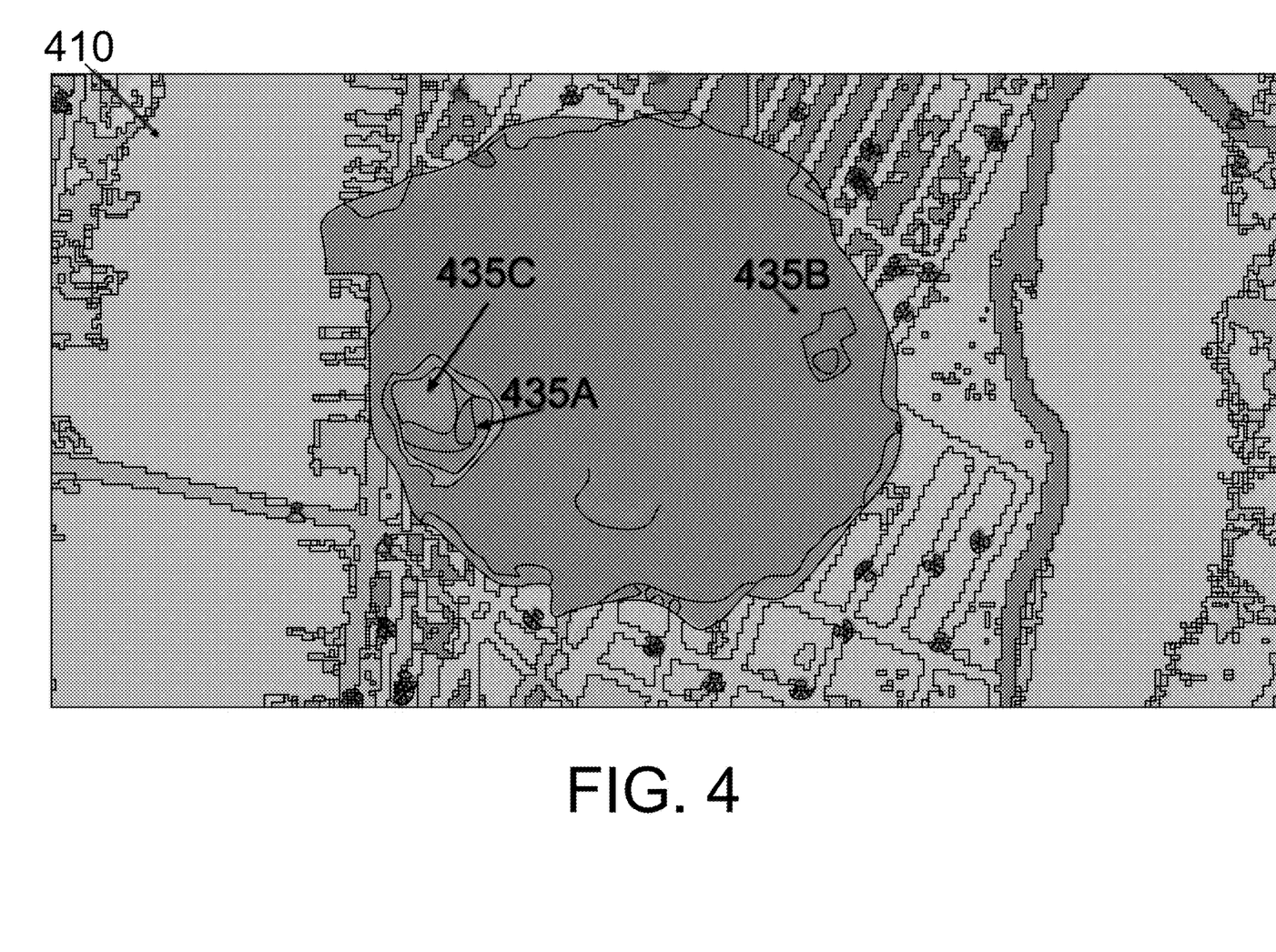
FIG. 4 shows an example composite potential interference map in accordance with the principles disclosed herein.

FIG. 4 shows an example composite potential interference map 410 in accordance with the principles disclosed herein. The signal leakage egresses of FIG. 1 can be normalized. Likewise, the information of the network elements and impairments of FIG. 3 is also normalized.

For example, if a level of the downstream cell service (e.g., the information forming FIG. 3) is combined with the level of signal leakage (e.g., the information forming FIG. 1) measured in the same location, a net service impairment potential can be created. The net service impairment potential can designate the areas of a plant that require imminent attention to avoid service disruptions. To create this dataset, multiple readings will be taken for each type of dataset. The readings can be converted into a continuous two-dimensional "map" for each type of data and assigned a normalized value relative to a predetermined threshold. For instance, leakage readings commonly span a range of 1 to 2000 microvolts per meter.

In some embodiments, this dataset is normalized to 100 microvolts, meaning values in the "leakage heatmap" would span from $\frac{1}{100}$ to 2. Likewise, a similar dataset would be created for any other dataset layer, for example cellular service strength. These multiple normalized datasets are combined by multiplying the values for a given geographical point on the map for both datasets selected.

The product of these pointwise multiplications is a new composite dataset that would represent the net service impairment potential. The composite dataset is referred to as a "hot-spot" and the illustrated example includes multiple hot-spots 435A, 435B, 435C. For each dataset involved $X_i$(latitude, longitude, time), where the value of "i" would be for instance signal leakage, or LTE signal strength, or some other relevant dataset. Each data point of each dataset at a corresponding location, and optionally time can be multiplied together to form a composite interference potential dataset as shown below:

$$IP(lat1, long1) = X_{leakage}(lat1, long1) * X_{LTE\ strength}(lat1, long1)$$

This value can be normalized in order to display on the same numeric scale by dividing the dataset members by the maximum member of the set:

$$\text{Normalized } IP(lat1, long1) = \frac{IP(lat1, long1)}{\text{Maximum } (IP)}$$

FIG. 4 also provides an entire network view based on a geographic format which combines the normalized signal leakage egresses and the normalized information of the network elements and or other information (e.g., ambient temperature, time-based data, etc.). The hot-spots 435A, 435B, 435C can be accompanied by a listing of faults to indicate the severity and location of the hot-spots 435A, 435B, 435C. In the illustrated example, the first hot-spot 435A is shown in a color representing a medium strength potential problem (e.g., yellow), hot-spot 435B is shown in a color representing a small strength potential problem (e.g., blue), and hot-spot 435C is shown in a color representing an elevated potential problem (e.g., orange). While these two datasets are illustrated herein, it should be understood that an infinite number of datasets can be illustrated herein to determine a net service impairment potential. For example, the network elements and the high strength regions of the signal leakage egress can be combined with datasets from a strand map. For example, the datasets may include signal lines and corresponding numerical values.

A challenge associated with large scale network monitoring is proper determination and assignment of severity level to each fault. For example, this is particularly important when dealing with extremely large networks where there may be thousands of faults across millions of customers. The present disclosure allows for continuous monitoring of numerous datasets, generating a composite dataset to consistently and accurately rate and prioritize network faults in a manner that can scale across these very large-scale networks.

Multiple heat-maps are combined into a single composite heat-map that would represent a view of the map that would illustrate regions with the most potential for the sources of all the individual heat-maps to exist in the same area. Put simply, if high strength regions 225 of signal leakage like those shown in FIG. 3 exist in the same place as other high strength regions 225 of signal leakage in a different dataset then the resulting composite product would be the regions of the most interest for problem resolution. Using this composite dataset, the disclosed system and method can generate and apply an interference potential factor to work orders, which supervisors can use to resolve interference issues in the order of severity.

In FIG. 1, the largest leak appeared to be the high-strength region 325E; however, there is no significant potential for interference with the neighboring cellular provider either to the LTE providers network or to the CATV provider due to the LTE downstream broadcast. Therefore, there is only a small strength region 435B in FIG. 4, in that region after combination acknowledging the influence of the large leak but indicating that it has very little chance of interference from or to the LTE network. Likewise, the small strength regions 325A, 325B, and 325C in FIG. 1 are gone in all areas except for the medium and elevated regions 435A, 435C indicated in FIG. 4, which indicates a stronger chance for both interference with and from the LTE provider. As a result, FIG. 1 alone may provide a false impression of the greatest potential interference. Therefore, a technician is not addressing interference potential leading to a likely complaint of interference from the LTE provider and perhaps significant network interference from the LTE on his own network.

Figure 5:
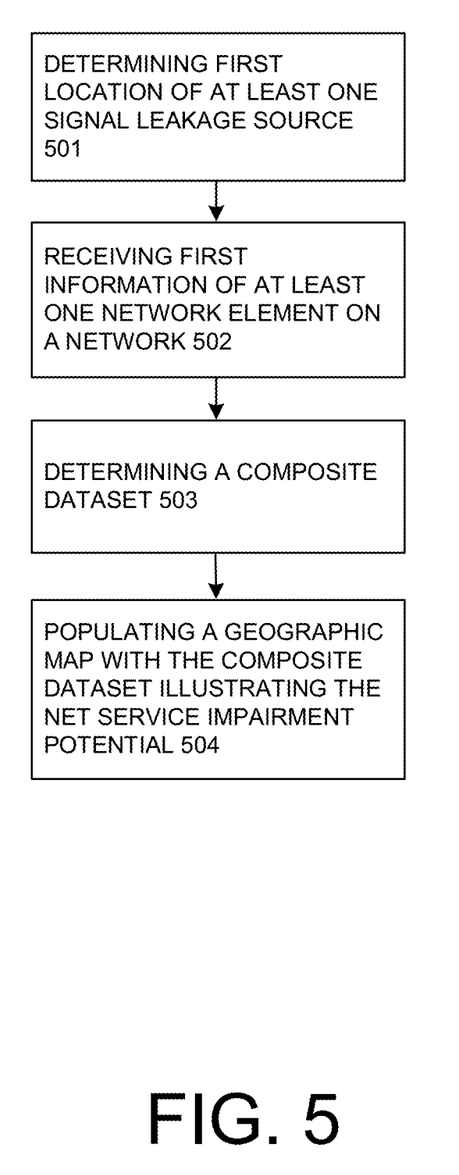
FIG. 5 depicts a flowchart of a method for mapping geocoded data to provide visualization and analysis of net service impairment potential, according to an exemplary embodiment.

FIG. 5 depicts a flowchart of a method 500 for mapping one or more net service impairment potentials according to an exemplary embodiment. One or more of the steps of the method 500 described herein can be implemented using a processing device, such as a server computer or other computing device operable with an application configured to perform the steps of method 500. In addition, one or more computing devices may communicate with a non-transitory computer readable storage medium having computer program instructions stored thereon that, when executed by a processor of the one or more computing devices, cause the processor to perform the steps of method 500.

At step 501, first location data and signal strength of at least one signal leakage source can be determined. As detailed herein, the physical location of a network fault may be determined by receiving information electronically of a physical topology of a network from one or more data sources. This may include data pulls of information concerning network components and geographic locations of the network components and terminal network elements and geographic locations of the terminal network elements. The network fault may also be detected by automatically and electronically monitoring performance parameters transmitted via upstream communications from terminal network elements and automatically estimating a physical location of the network fault based on the performance parameter detected.

At step 502, first information of the status of at least one network element of a network is received. For example, potential leaks of LTE signals and their respective locations may be received and determined at step 502. Information can be electronically received concerning the network element and the geographic location of the terminal network element. For example, a service address of the network element can be imported from a database, and the geographic location of the network element on the geographic map can be marked as the geographic location of the service address.

At step 503, a composite dataset may be determined based on the first information of the at least one network element and the first location data of the at least one signal leakage source. The datasets can be normalized as discussed above, then the normalized datasets may be combined by multiplying the values for a given geographical point on the map for both datasets. The product of these pointwise multiplications is a new composite dataset that would represent the net service impairment potential.

At step 504, a geographic map is populated with the composite dataset illustrating the net service impairment potential. A network monitoring and management system, tool or software can be provided with the ability to view the composite dataset and the contributing datasets. The network monitoring and management system, tool or software can be used by a service technician in the field. For example, the network monitoring and management software may be run on a remote server that is accessible by the technician such as via a secure wireless web interface. For instance, a mobile device, such as a portable, lap-top, notebook, or tablet computer, a smart phone, or the like may be used to obtain various views, information and maps as discussed above.

The present disclosure illustrates a first location data of a signal leakage source and first information of network element of a network to create composite datasets. However, other examples of datasets, such as datasets of strand map, ambient temperature, time-based data, etc. can be implemented herein to create composite datasets. In alternative embodiments, the composite datasets can be presented in tabular or other forms besides maps.

Accordingly, provided information can be used for rapid, real-time debugging of field issues and provide geographic information, provide real-time monitoring of upstream and downstream performance metrics and error states, and permit a technician to see the interdependency of multiple issues. The above can reduce the need for the technician to access the inside of residences, reduce the number of calls the technician needs to make to the head-end, and enable the technician to update network topology information while in the field. For purposes of this disclosure, "real-time" includes a level of responsiveness that is sufficiently fast to provide meaningful data that reflects current or recent network conditions as well as a level of responsiveness that tolerates a degree of lateness or built-in delay.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method for mapping a net service impairment potential, the computer-implemented method comprising:
   receiving first information of at least one network element on a network;
   determining first location data and signal strength of at least one signal leakage source, wherein determining the signal strength comprises:
      monitoring one or more performance parameters transmitted via upstream communications from a plurality of terminal network elements; and
      estimating the signal strength based on the one or more performance parameters;
   determining a composite dataset based on the first information of the at least one network element, the first location data and signal strength of the at least one signal leakage source;
   populating a geographic map with the composite dataset illustrating the net service impairment potential;
   determining second information of at least one network element on the network, the second information including fewer data points than the first information of the at least one network element; and
   determining a composite dataset based on the second information of at least one network element, the first location data and signal strength of the at least one signal leakage source.

2. The computer-implemented method of claim 1, further comprising normalizing the first information of the at least one network element.

3. The computer-implemented method of claim 1, further comprising normalizing the determined signal strength of the at least one signal leakage source.

4. The computer-implemented method of claim 1, wherein the first information of the at least one network element further comprises a Long-Term Evolution (LTE) signal of the at least one network element or an ambient temperature associated with the network element.

5. The computer-implemented method of claim 1, wherein the second information of at least one network element comprises a Long-Term Evolution (LTE) signal map of at least one node device in a first area.

6. The computer-implemented method of claim 5, wherein the first location data and signal strength of the at least one signal leakage source comprises a signal leakage heat-map in the first area.

7. A signal processing electronic device for mapping a net service impairment potential visual, comprising:
a storage device; and
a processor executing program instructions stored in the storage device to:
receive first information of at least one network element on a network;
determine first location data and signal strength of at least one signal leakage source, wherein determining the signal strength comprises:
monitoring one or more performance parameters transmitted via upstream communications from a plurality of terminal network elements; and
estimating the signal strength based on the one or more performance parameters;
determine a composite dataset based on the first information of the at least one network element and the first location data and signal strength of the at least one signal leakage source;
populate a geographic map with the composite dataset illustrating the net service impairment potential;
determine second information of at least one network element on the network, the second information including fewer data points than the first information of the at least one network element; and
determine a composite dataset based on the second information of at least one network element, the first location data and signal strength of the at least one signal leakage source.

8. The signal processing electronic device of claim 7, wherein the processor executing program instructions stored in the storage device normalizes the first information of the at least one network element.

9. The signal processing electronic device of claim 7, wherein the processor executing program instructions stored in the storage device normalizes the determined signal strength of the at least one signal leakage source.

10. The signal processing electronic device of claim 7, wherein the first information of the at least one network element further comprises a Long-Term Evolution (LTE) signal of the at least one network element or a strand map of the network.

11. The signal processing electronic device of claim 7, wherein the second information of at least one network element comprises a Long-Term Evolution (LTE) signal map of at one least node device in a first area.

12. The signal processing electronic device of claim 11, wherein the first location data and signal strength of the at least one signal leakage source comprises a signal leakage heat-map in the first area.

13. At least one non-transitory computer readable storage medium having computer program instructions stored thereon that, when executed by at least one processor, cause the at least one processor to perform operations for mapping a net service impairment potential, said operations comprising:
receive first information of at least one network element on a network;
determine first location data and signal strength of at least one signal leakage source, wherein determining the signal strength comprises:
monitoring one or more performance parameters transmitted via upstream communications from a plurality of terminal network elements; and
estimating the signal strength based on the one or more performance parameters; and
determine a composite dataset based on the first information of the at least one network element, the first location data and signal strength of the at least one signal leakage source; and
populate a geographic map with the composite dataset illustrating the net service impairment potential;
determine second information of at least one network element on the network, the second information including fewer data points than the first information of the at least one network element; and
determine a composite dataset based on the second information of at least one network element, the first location data and signal strength of the at least one signal leakage source.

14. The non-transitory computer readable storage medium of claim 13, further comprising program instructions stored thereon that, when executed by at least one processor, cause the at least one processor to perform the following operations:
normalize the first information of the at least one network element.

15. The non-transitory computer readable storage medium of claim 13, further comprising program instructions stored thereon that, when executed by at least one processor, cause the at least one processor to perform the following operations:
normalize the determined signal strength of the at least one signal leakage source.

* * * * *